R. L. EDDY.
SELF CLEANING FILTER FOR CARBURETER INTAKES.
APPLICATION FILED MAY 12, 1919. RENEWED MAR. 23, 1921.
1,377,191.
Patented May 10, 1921.
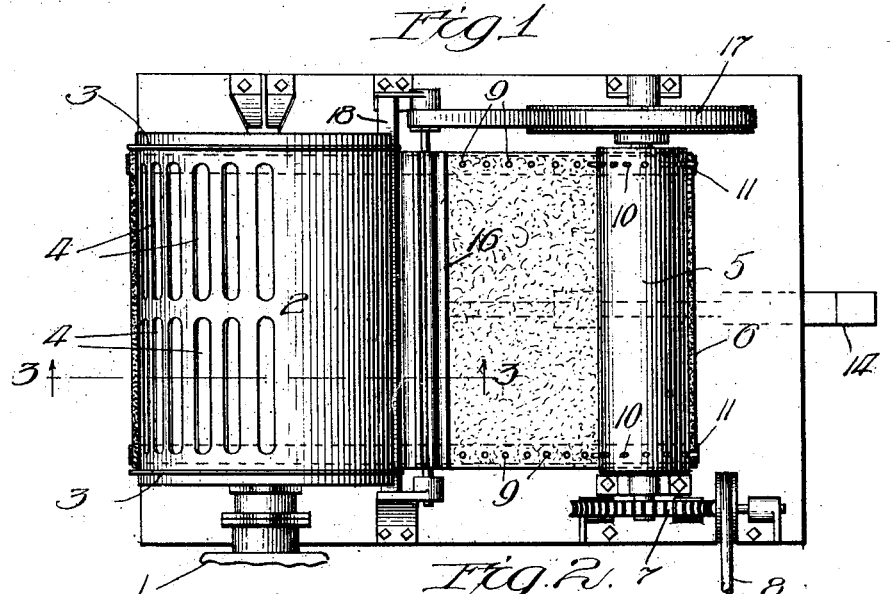
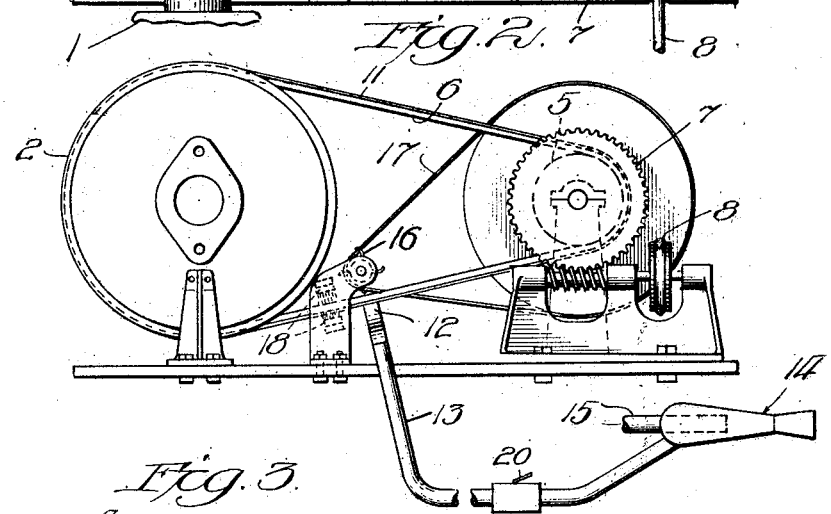
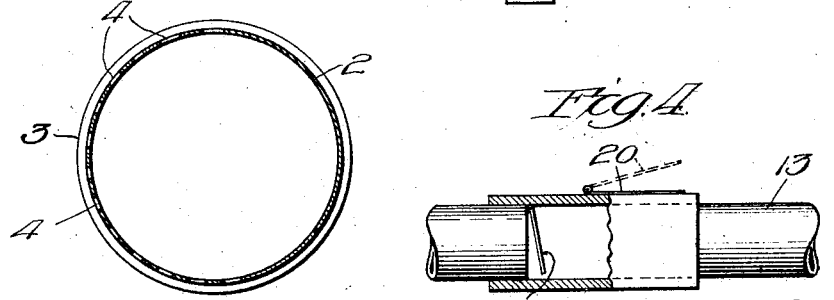
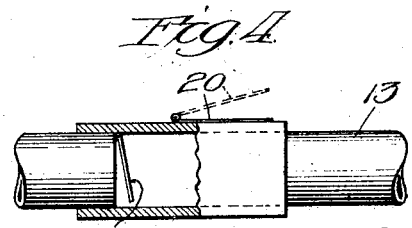

UNITED STATES PATENT OFFICE.

RAY L. EDDY, OF CHICAGO, ILLINOIS, ASSIGNOR OF ONE-HALF TO WILLIAM H. WASHBURNE, OF CHICAGO, ILLINOIS.

SELF-CLEANING FILTER FOR CARBURETER-INTAKES.

1,377,191.      Specification of Letters Patent.      Patented May 10, 1921.

Application filed May 12, 1919, Serial No. 296,659. Renewed March 23, 1921. Serial No. 454,901.

*To all whom it may concern:*

Be it known that I, RAY L. EDDY, a citizen of the United States, residing at Chicago, county of Cook, State of Illinois, have invented a certain new and useful Improvement in Self-Cleaning Filters for Carbureter-Intakes, and declare the following to be a full, clear, and exact description of the same, such as will enable others skilled in the art to which it pertains to make and use the same, reference being had to the accompanying drawings, which form a part of this specification.

The air drawn into the carbureter of a moving motor vehicle is always more or less dust-laden and, in some localities, the dust content is so great that it is practically essential to provide some means for cleaning the air before it enters the engine cylinders. The most common method of cleaning the air is to strain it through a filter but, the more serious the condition to be remedied by the filter, the less efficient the latter becomes on account of the clogging action of the dirt and dust which soon chokes the filter.

The object of the present invention is to produce a simple and novel means which will filter the air taken in by a carbureter and automatically clean itself so that it will always be in condition to operate efficiently and without unduly checking the flow of air to the carbureter.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a top plan view of an apparatus arranged in accordance with my invention, the upper run of the filtering medium, which is in the form of an endless belt, being broken away;

Fig. 2 is a side elevation of the mechanism shown in Fig. 1;

Fig. 3 is a transverse section through the carbureter intake, taken approximately on line 3—3 of Fig. 1; and Fig. 4 is a view on an enlarged scale, partly in side elevation and partly in section, of the back pressure valve device in the suction cleaner.

Referring to the drawing, 1 represents the intake end of a carbureter to which is attached a stationary, hollow, closed cylinder or drum, 2, preferably flanged at the ends, as indicated at 3. In the cylindrical periphery of the member 2 are openings through which the air is drawn into the carbureter. In the arrangement shown, the openings take the form of long narrow slots, 4, which, together, produce a large intake opening without destroying the cylindrical contour of the intake. Parallel with and spaced apart from the member 2 is a roller, 5, having approximately the same length as the member 2. An endless belt, 6, of filtering material passes around the drum and around the roller; the roller being slowly operated by suitable driving means, 7, actuated through a belt, 8, or other means driven from the cam shaft or other rotatable part of the engine to which the carbureter supplies fuel. The openings in the drum are so disposed that they will be completely closed by the belt, so that all air entering the carbureter must pass through the latter. The surface of the stationary drum is made smooth so that when the roller is operated the belt will slip over the drum. In order to insure that the belt will not also slip on the roller some positive driving connection between the roller and the belt may be employed. In the arrangement shown, the belt is provided with perforations, 9, adapted to receive projecting pins, 10, on the roller. If desired, since the belt will usually be made of felt or other stretchable material, it may be reinforced along the lines of perforations by means of narrow bands, 11, of thin metal or other mechanically strong material.

The driving means for the belt is so designed that the belt will travel slowly during the operation of the engine; only a sufficiently rapid rate of travel being necessary to insure that each portion of the belt, after reaching the intake opening, is carried beyond the latter before any clogging takes place or its efficiency is otherwise impaired. Then, while each portion of the belt is passing from the drum to the driving roller, it is thoroughly cleaned by removing therefrom the accumulated dust and other foreign matter which was strained out of the air by that portion of the belt while overlying the intake opening.

The cleaning means for the belt may take various forms. In the arrangement shown, there are several varieties of cleaning devices which may be employed singly or in any desired combination. Assuming that the roller, as viewed in Fig. 2, runs in the counterclockwise direction, it will be seen that the part of the belt requiring cleaning is the lower run between the drum and the roller, and that the greater portion of the foreign matter will be on or near the under surface of this portion of the belt. I have therefore placed underneath the lower run of the belt a suitable vacuum cleaning device which may consist of a suitable nozzle, 12, of well known construction connected to a suction pipe, 13. Suction through the pipe 13 may be induced in any suitable manner, conveniently by utilizing the exhaust of the engine. To this end, the pipe 13 may lead into the closed end of a nozzle-like part, 14, into which extends also the exhaust pipe, 15, of the engine, or a branch of such exhaust pipe; the pipe 15 extending axially of the part 14 through the closed end thereof and terminating at a point lying a considerable distance within the open end of the member 14. With this construction, when the engine is in operation, a strong suction is produced in the pipe 13, and the dirt is collected by the nozzle from the belt and carried through the pipe 13 to be finally blown out of the open end of the member 14.

If desired, a suitable beater, 16, may be placed in position to beat the belt and thus loosen and drive off the dirt; the beater being rapidly driven through a belt, 17, or other suitable means. A still further means which may be employed for cleaning the belt consists of a pair of long brushes, 18, between which the belt passes.

In order to prevent flame or hot gases from being blown backward through the suction pipe, 13, a suitable back pressure valve device may be located in this pipe. Such a device may conveniently consist of a check valve, 19, in the pipe 13 and an outwardly-opening safety valve, 20, lying between the check valve and the suction producing device, 14. Normally the valve 19 does not interfere with the flow of air through the pipe 13 away from the belt; but, in case of a back-flow of air or gas, the check valve will close and the safety valve, 20, will open and permit the pressure to be relieved.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. The combination with the intake of a carbureter, of a filtering element, a suction cleaning device for the filtering element, an engine exhaust conduit, and a connection between said exhaust conduit and said cleaning device for producing a suction in said device.

2. The combination with a stationary air intake in the form of a closed cylinder having a perforated periphery, of an endless belt of filtering material passing over said air intake and covering the openings therein, means for moving said belt, and means acting on the belt at a point remote from the intake opening for removing therefrom the material strained out of the air.

In testimony whereof, I sign this specification.

RAY L. EDDY.